(12) United States Patent
Kim et al.

(10) Patent No.: US 8,359,608 B2
(45) Date of Patent: Jan. 22, 2013

(54) MOTOR HAVING IMPROVED SLEEVE HOLDER AND BASE PLATE COUPLING STRUCTURE AND OPTICAL DISC DRIVE USING THE SAME

(75) Inventors: Pyo Kim, Gyunggi-do (KR); Jae Yoon Kim, Gyunggi-do (KR); Dong Yeon Shin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 24 days.

(21) Appl. No.: 12/929,335

(22) Filed: Jan. 14, 2011

(65) Prior Publication Data

US 2012/0017227 A1 Jan. 19, 2012

(30) Foreign Application Priority Data

Jul. 16, 2010 (KR) .................. 10-2010-0069188

(51) Int. Cl.
*G11B 33/14* (2006.01)
*H02K 5/167* (2006.01)

(52) U.S. Cl. .............. 720/697; 360/99.16; 360/99.08; 310/425

(58) Field of Classification Search .......... 360/265.6, 360/99.08, 99.16, 99.04, 98.07; 720/696; 310/425
See application file for complete search history.

(56) References Cited

U.S. PATENT DOCUMENTS

| | | | |
|---|---|---|---|
| 5,552,650 A * | 9/1996 | Cap et al. ................. | 310/67 R |
| 5,600,514 A * | 2/1997 | Fukuzawa ................. | 360/99.08 |
| 5,672,927 A * | 9/1997 | Viskochil ................. | 310/194 |
| 5,796,707 A * | 8/1998 | Kim ........................ | 720/697 |
| 5,883,751 A * | 3/1999 | Choy ....................... | 360/84 |
| 6,181,669 B1 * | 1/2001 | Park ........................ | 720/697 |
| 6,772,428 B2 * | 8/2004 | Kim et al. ................ | 720/697 |
| 6,956,713 B2 * | 10/2005 | Shinmi et al. ............ | 318/400.41 |
| 6,965,492 B2 * | 11/2005 | Obata et al. ............. | 360/99.08 |
| 7,023,116 B2 * | 4/2006 | Kuribara .................. | 310/90 |
| 7,249,363 B2 * | 7/2007 | Noda et al. .............. | 720/721 |
| 7,496,940 B2 * | 2/2009 | Wang ....................... | 720/697 |
| 7,508,102 B2 * | 3/2009 | Sugiyama et al. ....... | 310/67 R |
| 7,593,182 B2 * | 9/2009 | Tamaoka et al. ........ | 360/99.08 |
| 7,652,851 B2 * | 1/2010 | Hashi et al. ............. | 360/265.6 |
| 7,760,464 B2 * | 7/2010 | Xu et al. .................. | 360/99.16 |
| 8,099,743 B2 * | 1/2012 | Wada ....................... | 720/691 |
| 8,148,882 B2 * | 4/2012 | Yoon ........................ | 310/425 |

(Continued)

FOREIGN PATENT DOCUMENTS

JP 2006067652 A * 3/2006
JP 2007-185039 7/2007

OTHER PUBLICATIONS

Partial Machine translation of JP2006-67652; Yoshida, 12 pages, Mar. 9, 2006.*

*Primary Examiner* — Brian Miller

(57) ABSTRACT

There is provided a motor formed to have a simple coupling structure between a base plate and a sleeve holder, thereby implementing a simple structure and reducing costs and processes taken for manufacturing the motor, and an optical disc drive using the same. To this end, the motor includes a base plate having at least one protrusion formed therein, and a sleeve holder having a body part, of which the shape is cylindrical and in which a sleeve is fitted, and a flange protrudingly formed from a lower end of the body part in such a manner as to make surface-to-surface contact with an upper surface of the base plate, wherein the flange is formed to have at least one insertion hole, through which the protrusion is inserted so that the sleeve holder is coupled to the base plate.

9 Claims, 5 Drawing Sheets

U.S. PATENT DOCUMENTS

2003/0112734 A1* 6/2003 Shishido et al. ............. 369/263
2011/0219392 A1* 9/2011 Yoon et al. ................... 720/663
2012/0017225 A1* 1/2012 Smirnov et al. ............... 720/695
2012/0017226 A1* 1/2012 Smirnov et al. ............... 720/695

* cited by examiner

MOTOR HAVING IMPROVED SLEEVE HOLDER AND BASE PLATE COUPLING STRUCTURE AND OPTICAL DISC DRIVE USING THE SAME

CROSS-REFERENCE TO RELATED APPLICATIONS

This application claims the priority of Korean Patent Application No. 10-2010-0069188 filed on Jul. 16, 2010, in the Korean Intellectual Property Office, the disclosure of which is incorporated herein by reference.

BACKGROUND OF THE INVENTION

1. Field of the Invention

The present invention relates to a motor and an optical disc drive using the same, and more particularly, to a motor with an improved coupling structure between a sleeve holder and a base plate, and an optical disc drive using the same.

2. Description of the Related Art

In general, a spindle motor installed in an optical disc drive functions to rotate a disc in such a manner that an optical pickup device can read data recorded on the disc.

In the conventional spindle motor, a circuit board is mounted on a base plate with holes formed on its center, through which a sleeve holder is inserted to be fixed to the base plate. Also, a separate supporting plate is coupled to a lower surface of the sleeve holder.

The conventional sleeve holder is formed by cutting processing, and is formed of relatively expensive brass. Even though the brass of the sleeve holder has a high price, it has been mainly used. Therefore, the conventional motor has a disadvantage in that manufacturing costs are increased due to the high-priced brass used therein.

SUMMARY OF THE INVENTION

An aspect of the present invention provides a motor which is made to have an improved coupling structure between a base plate and a sleeve holder, thereby implementing a reduction in costs and processes taken for manufacturing, and an optical disc drive using the same.

An aspect of the present invention also provides a motor including: a base plate having at least one protrusion formed therein; and a sleeve holder having a body part, of which the shape is cylindrical and in which a sleeve is fitted, and a flange protrudingly formed from a lower end of the body part in such a manner as to make surface-to-surface contact with an upper surface of the base plate, wherein the flange is formed to have at least one insertion hole, through which the protrusion is inserted so that the sleeve holder is coupled to the base plate.

The protrusion may be formed through burring processing.

The protrusion may include an extension part formed by bending an end of the protrusion toward an outer diameter thereof.

The sleeve holder may be manufactured by any one of press processing and injection-molding processing.

The sleeve holder may have an enlarged part protruded in such a manner that an outer diameter of the body part is extended along a circumferential surface of the body part.

The enlarged part is extensively protruded to reach the flange.

The motor may further include a stator seated on and fixedly coupled to the enlarged part of the sleeve holder.

The base plate may have a receiving part, formed to have a groove shape at a position where the body part of the sleeve holder is projected.

The motor may further include a thrust plate, fixedly inserted into the receiving part and supporting a lower end of a shaft rotatably inserted in the sleeve.

Another aspect of the present invention also provides a motor including: a bearing assembly rotatably supporting a shaft; a stator having a core extended toward an outer diameter thereof and a winding coil wound around the core which is in contact with an outer side of the bearing assembly; a rotor pressingly fixed to the shaft while receiving the stator; and a base plate having at least one protrusion on an upper surface thereof, the at least one protrusion being fixedly coupled to the bearing assembly to be fixed to the bearing assembly, the base plate being formed to have a panel shape.

The bearing assembly may have a flange formed on a lower end thereof to make surface-to-surface contact with the base plate, the flange including at least one insertion hole through which the protrusion is inserted, and the protrusion having an extension part formed on an end thereof in such a manner as to prevent a departure of the bearing assembly.

Another aspect of the present invention also provides a motor including: a base plate formed to have a panel shape; and a sleeve holder having a body part in which a sleeve is fitted, and a flange protruded from a lower end of the body part in such a manner as to make surface-to-surface contact with an upper surface of the base plate, wherein the sleeve holder is coupled to the base plate by a protrusion protrudingly formed on any one of a lower surface of the flange and an upper surface of the base plate.

Another aspect of the present invention also provides an optical disc drive including: the motor as described above; and an optical pickup device which is movably installed in a space below a disc mounted on a motor, and the optical pickup device receiving data from the disc.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
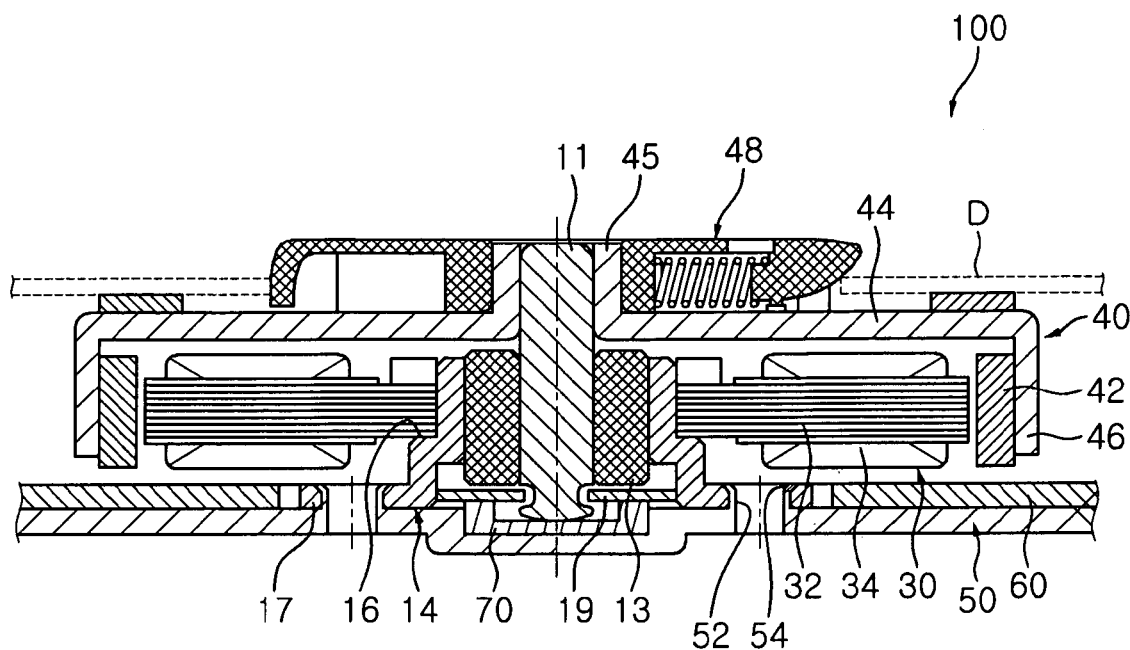
FIG. 1 is a cross-sectional view schematically showing a motor according to an embodiment of the present invention.

While this specification contains many specifics these should not be construed as limitations on the scope of any invention described herein or of what may be claimed, but rather, as descriptions of features that may be specific to particular embodiments of particular inventions. Certain features that are described herein in the context of separate embodiments may also be implemented in combination in a single embodiment. Conversely, various features that are described in the context of a single embodiment may also be implemented in multiple embodiments separately or in any suitable sub-combination. It should be understood that the terms used herein and the appended claims are not necessarily limited to general and dictionary meanings, but should be interpreted based on the meanings and concepts corresponding to technical aspects of the invention as described herein.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

Meanwhile, the terms relating to directions used herein are made as follows. Referring to FIG. 1, the axial direction refers to a vertical direction on the basis of the shaft 11, and an outer diameter direction or an inner diameter direction refers to a direction of towards the outer end of the rotor case 40 on the basis of the shaft 11 or towards a central direction of the shaft 11 on the basis of the outer end of the rotor case 40.

Hereinafter, a detailed description will be given of an embodiment of the present invention with reference to the accompanying drawings.

Figure 2A:
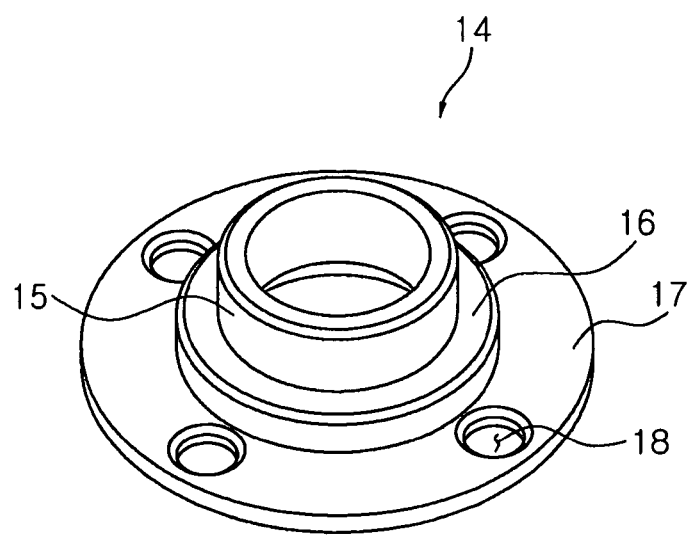
FIGS. 2A and 2B are views showing the sleeve holder of FIG. 1, respectively.
Figure 2B:
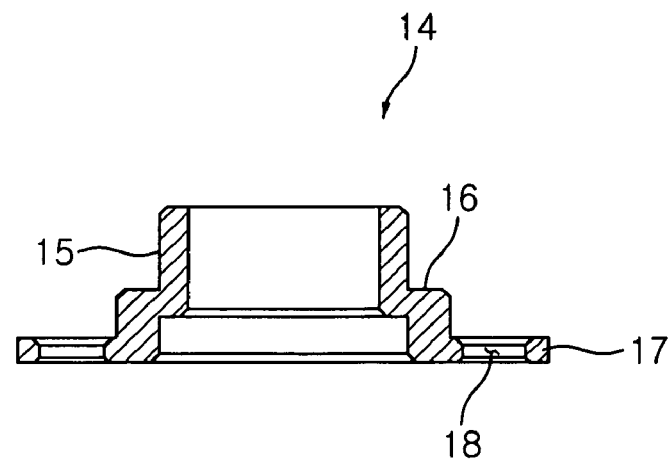
Figure 3:
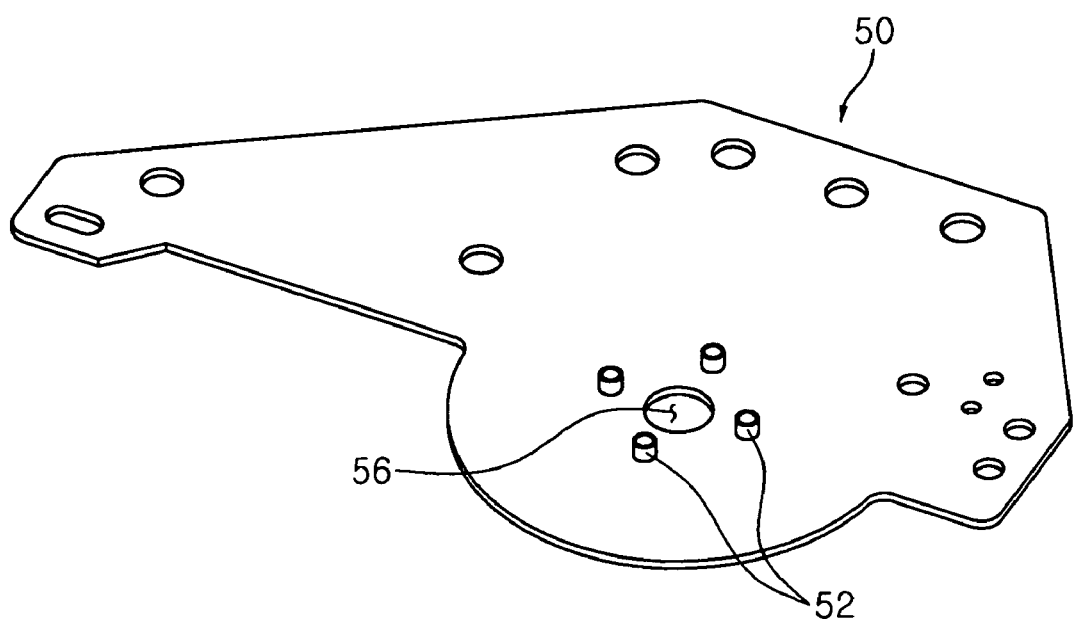
FIG. 3 is a perspective view showing the base plate of FIG. 1.
Figure 4:
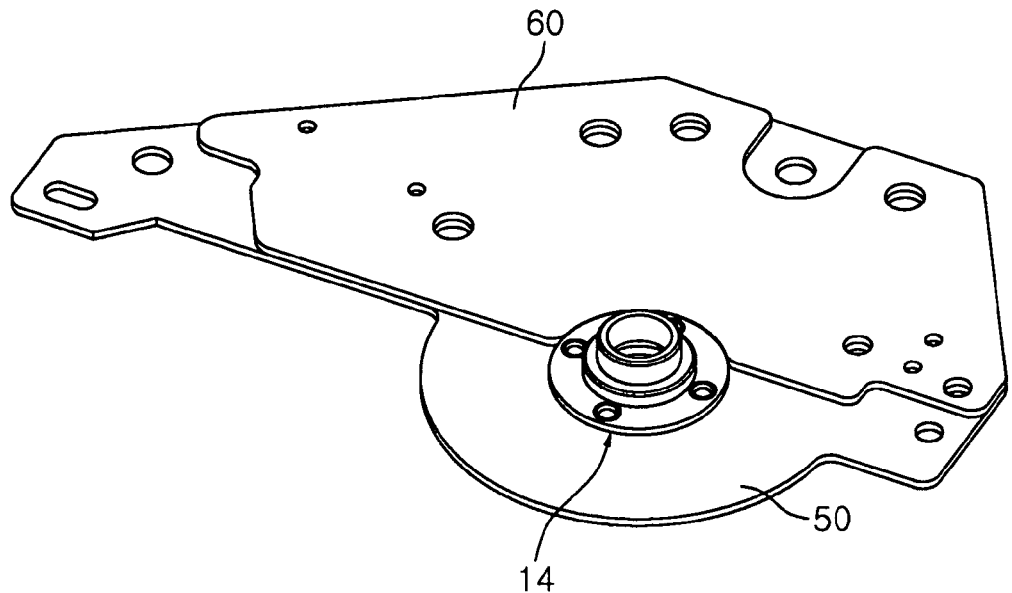
FIG. 4 is a perspective view showing a state where the sleeve holder of FIG. 2 is coupled to the base plate of FIG. 3.

FIG. 1 is a cross-sectional view schematically showing a motor according to the embodiment of the present invention. FIGS. 2A and 2B are views showing the sleeve holder of FIG. 1, respectively. FIG. 3 is a perspective view showing the base plate of FIG. 1. FIG. 4 is a perspective view showing a state in which the sleeve holder of FIG. 2 is coupled to the base plate of FIG. 3.

Referring to FIGS. 1 to 4, the motor 100 is a spindle motor provided in the optical disc drive to rotate the disc D, and the motor 100 includes a bearing assembly 10, a base plate 50, a circuit board 60, a stator 30, and a rotor 40.

The bearing assembly 10 includes a shaft 11, a sleeve 13, and a sleeve holder 14.

The shaft 11 forms a rotation axis of the rotor 40 to be described later. The lower end of the shaft 11 may be provided with stopper coupling grooves 12 through which a stopper ring 19 is inserted, for preventing the shaft from being separated from the sleeve 13 as the rotor case 44 rotates at a high speed.

The shaft 11 is inserted through a hole formed in the sleeve 13. The sleeve 13 is a rotation supporting member to facilitate rotating the shaft 11 through an oil film made between the shaft 11 and the sleeve 13, and acts as a bearing. The outer circumferential surface of the sleeve 13 is forcibly inserted in and fitted to an inside of the sleeve holder 14.

The sleeve holder 14 is a stationary structure for rotatably supporting the shaft 11 within the sleeve holder, and rotatably supports the shaft 11 through the sleeve 13.

The sleeve holder 14 includes a body part 15 formed to have a cylindrical shape, and a flange 17 which is protruded toward an outer diameter of the lower end of the body part 15 in such a manner as to make surface-to-surface contact with an upper surface of the base plate 50.

The sleeve 13 is fitted in the body part 15. An enlarged part 16 is formed on the outer circumferential surface of the body part 15. The enlarged part 16 has a step which is protruded toward the outer diameter of the body part 15 along the outer circumferential surface of the body part 15. Also, the enlarged part 16 is extensively protruded to reach the flange 17. Thus, an inner space between the enlarged part 16 and the flange 17 is formed to be a wider enlarged space.

The outer circumferential surface of the enlarged part 16 with the step is used as a position which the stator 30 is seated on and fixedly coupled to. The inner space extended by the enlarged part 16 is used as a space in which a thrust plate 70 and a stopper ring 19 are received.

The flange 17 is protruded toward the outer diameter of the lower end of the body part 15 at a predetermined distance. At least one of insertion holes 18 is formed in the flange 17. Each of the insertion holes 18 is used as a part through which each of the protrusions 52 of the base plate 50 is inserted. Therefore, the number and the positions of the insertion holes 18 are formed to correspond to those of the protrusions 52 formed on the base plate 50. Also, each of the insertion holes 18 may have an inner circumference which is in contact with the upper surface of the flange 17, as shown in FIGS. 2 and 3. The inner circumference may be formed with a tapered inclined surface. This is for fixing the flange 17 through easy bending of the extension part 54, formed by bending ends of the protrusions 52. The shape of the flange 17 according to the embodiment of the present invention is not limited thereto, and may be also formed to have a curved shape. The present invention may be applicable in various manners.

The sleeve holder 14 according to the embodiment of the present invention may be manufactured by press processing, or by injection molding a steel plate, instead of brass used in the related art. Therefore, it is possible to easily manufacture a sleeve holder at a low cost.

The base plate 50 is a supporting body for entirely supporting other components of the motor 100. As described above, the sleeve holder 14 and a circuit board 60 to be described later are fixedly coupled to one surface (i.e., the upper surface) of the base plate 50.

According to the embodiment of the present invention, the base plate 50 is formed to be integrated with the conventional supporting plate. The sleeve holder 14 is coupled to the upper surface of the base plate 50.

To this end, the base plate 50 may include at least one of protrusions 52, and a receiving part 56 receiving a thrust plate 70 to be described later. At this time, the protrusions are formed on the inside of the base plate 50.

Each of the protrusions 52 is protrudingly formed at a predetermined distance from one surface (i.e., the upper surface) of the base plate 50. Each of the protrusions 52 is inserted through each of the insertion holes 18 formed on the flange 17 of the sleeve holder 14. Therefore, each of the protrusions 52 is formed to have a size corresponding to that of each of the insertion holes 18, and is protruded at a length identical to the thickness of the flange 17.

In particular, as shown in FIG. 3, a plurality of protrusions is formed on positions corresponding to the insertion holes 18. The protrusions 52 may be formed by burring processing. Thus, each of the protrusions 52 is formed in a hollow cylindrical shape.

Also, each of the protrusions 52 is provided with an extension part 54 made by bending the ends of the protrusions inserted in the insertion holes 18 of the flange 17 toward the outer diameter thereof. The formation of the extension part 54 may be made by inserting the cylindrical-shaped protrusions 52 into the insertion holes of the flange 17, and then bending the ends of the protrusions 52 through spinning and caulking.

The receiving part 56 is formed to have a groove shape at a position where the body part 15 of the sleeve holder 14 is projected. Herein, the motor 100 is formed to have a structure in which the base plate 50 is provided with a supporting plate in itself through the receiving part, even without a separate supporting plate for supporting the shaft. Therefore, unlike the related art, the present invention requires no separate supporting plate.

The receiving part 56 receives a thrust plate 70 and a stopper ring 19. Therefore, the receiving groove 56 is formed to be large enough to receive the trust plate 70 and the stopper ring 19.

The base plate 50 with the above-described structure is formed of a metallic material. More preferably, the base plate 50 is made of steel, and may be formed by press processing. However, the present invention is not limited thereto.

The thrust plate 70 is received in the receiving part 56 formed on the base plate 50. The thrust plate 70 supports the shaft 11 while the upper surface thereof is in contact with the lower end of the shaft 11.

The circuit board 60 may be coupled to the entire upper surface of the base plate 50. The inside of the circuit board 60 is provided with circuit patterns (not shown) which apply power to the motor 100. The circuit board 60 is electrically connected to the winding coil 34 of the rotor 40 to be described later to thereby apply a power to the winding coil 34. Also, a ground pattern of the circuit patterns in the circuit board 60 may be formed to be electrically coupled to the base plate 50. As for the circuit board 60, various types of substrates, such as a printed circuit board or a flexible PCB, may be selectively used according to necessity.

The stator 30 may be a stationary structure which includes the core 32 and the winding coil 34 wound around the core 32.

The core 32 is constituted by stacking a plurality of steel plates, and is extensively formed toward the outer diameter of the shaft 11, in a radial direction, on the basis of the shaft 11. The core 32 is seated on the upper surface of the enlarged part 16 of the sleeve holder 14, and fixedly coupled to the sleeve holder 14.

As a coil wound around the core 32, the winding coil 34 generates an electromagnetic field when power is applied thereto. The winding coil 34 is electrically connected to the circuit board 60 to thereby receive power supplied from the circuit board 60.

The rotor 40 includes a magnet 42 and a rotor case 44.

The magnet 42 is a circular-ring shape permanent magnet whose poles (N and S poles) are alternately magnetized in the cylindrical direction to thereby create an electromagnetic field having a predetermined strength.

The rotor case 44 is shaped like a cup which receives the stator, and the rotor case 44 includes a rotor hub 45, and a magnet coupling part 46.

The rotor hub 45 is forcibly inserted onto the upper part of the shaft 11 to be fixedly coupled thereto. The rotor hub 45 is formed to have a shape bent toward the upward side in an axial direction thereof, in order to maintain a drawing force together with the shaft 11. Also, the rotor hub 45 has an outer circumferential surface to which a chucking device 48 for securing the disk D is coupled.

The magnet 42 is coupled to the magnet coupling part 46. The magnet coupling part 46 is formed along the inner circumferential surface thereof. At this time, the magnet 42 is disposed to face the core 32 around which the winding coil 34 is wound. Therefore, when power is applied thereto, the winding coil 34 rotates by electromagnetic interaction produced between the magnet 42 and the winding coil 34. As the rotor 40 rotates, the chucking device 48 and the shaft 11 coupled to the rotor case 44 rotate together with each other.

Next, a description will be made of a method in which the sleeve holder 14 is coupled to the base plate 50.

FIGS. 5A to 5D are views showing a method in which the base plate is coupled to the sleeve holder according to an embodiment of the present invention, respectively.

Figure 5A:
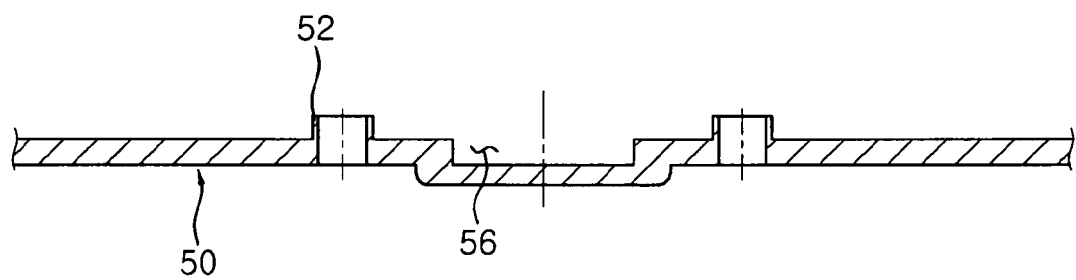
FIGS. 5A to 5D are views showing a method in which the sleeve holder is coupled to the base plate according to an embodiment of the present invention, respectively.

First of all, referring to FIG. 5A, the base plate 50 having the protrusions 52 formed therein is prepared. At this time, each of the protrusions 52 is formed to have a cylindrical shape which has no extension part (indicated by reference numeral 54 of FIG. 1) of the base plate 50. Also, each of protrusions 52 is protruded to have a length longer than or similar to the thickness of the flange 17 of the sleeve holder 14.

Figure 5B:
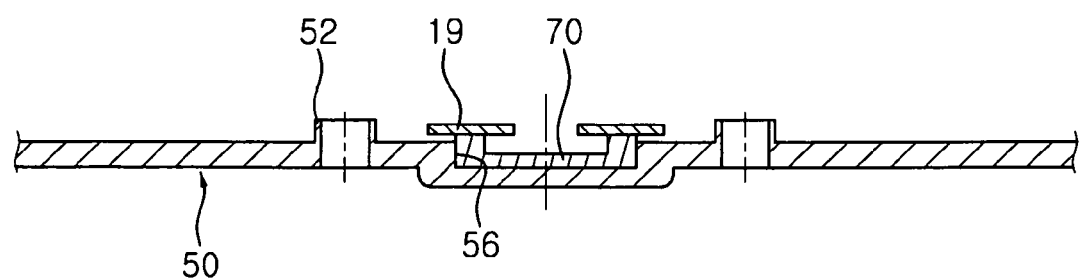

Next, as shown in FIG. 5B, the stopper ring 19 and the thrust plate 70 are inserted into the receiving part 56 of the base plate 50.

Figure 5C:
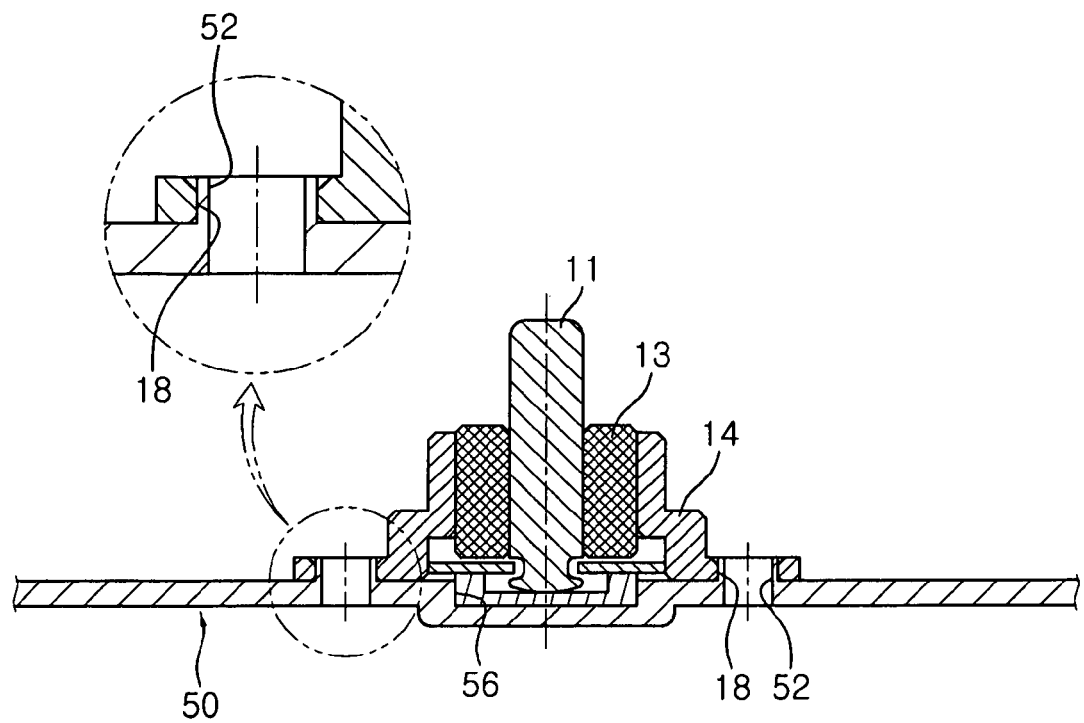

Next, as shown in FIG. 5C, the sleeve holder 14, having the sleeve 13 and the shaft 11 inserted therein, is coupled to the base plate 50. At this time, the flange 17 of the sleeve holder 14 comes to be in contact with the upper surface of the base plate 50, and the protrusions 52 are positioned to be penetrated through the insertion holes 18, respectively.

Figure 5D:
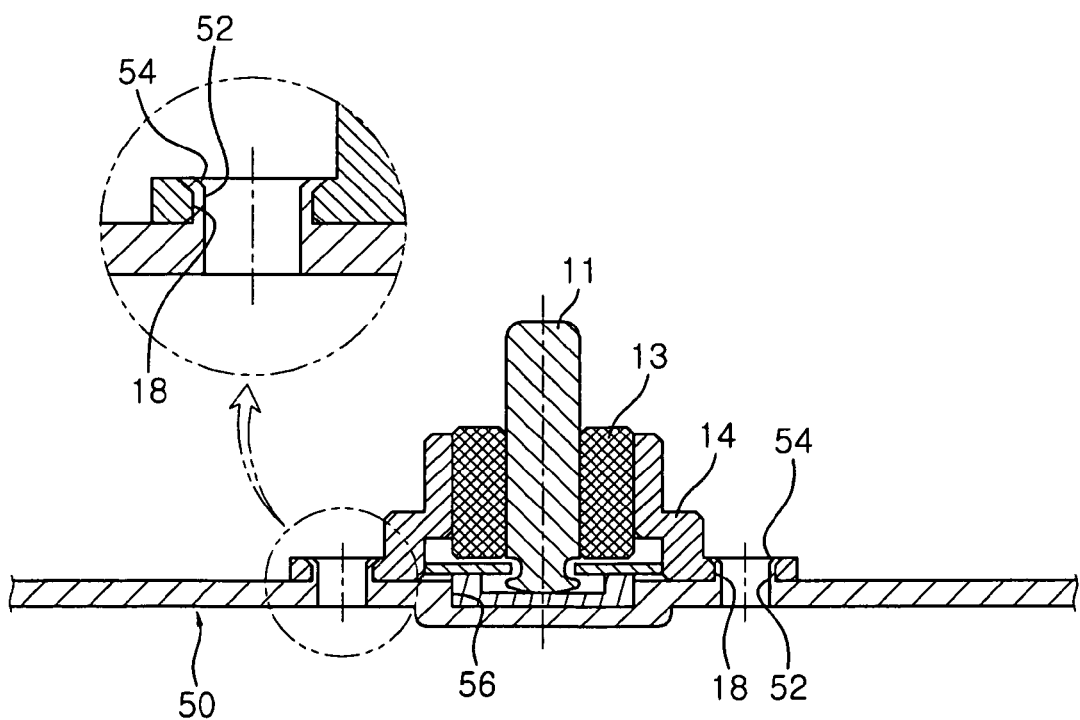

Next, as shown in FIG. 5D, the extension part 54 is formed by bending an end of each protrusion on the upper part of the flange 17.

As described above, this process may be performed by spinning and caulking. Thus, the sleeve holder 14 is tightly coupled to the upper surface of the base plate 50.

Thereafter, the motor (indicated by reference numeral 100 of FIG. 1) according to the embodiment of the present invention is completely made by performing the process in which the stator (indicated by reference numeral 30 of FIG. 1) and the rotor (indicated by reference numeral 40 of FIG. 1) are coupled to the sleeve holder 14 and the shaft 11.

By the above-mentioned process, the sleeve holder of the embodiment of the present invention is fixedly coupled to the base plate 50.

Meanwhile, the above-mentioned method in which the sleeve holder 14 and the base plate 50 are coupled to each other has been described by taking an example where the sleeve 13 and the shaft 11 are inserted into the sleeve holder 14 as shown in FIG. 5C, and then coupled to the base plate 50.

However, the present invention is not limited thereto. That is, the sleeve holder 50 alone is first coupled to the base plate 50, and then the sleeve 13 and the shaft 11 are inserted into and coupled to the sleeve holder 14. As described above, various kinds of methods may be manufactured.

Also, the sleeve holder 14, in which the sleeve 13 alone has been inserted, is coupled to the base plate 50. Thereafter, it is possible to manufacture a motor by inserting the shaft 11 into the sleeve 13 in various manners.

Although it has been described in the embodiments that each of the protrusions 52 is formed to have a hollow cylindrical shape, the present invention is not limited thereto. Each of the protrusions 52 may also be formed such that its internal space is filled.

Also, the above-mentioned embodiment has been described by taking an example in which the sleeve holder 14 is coupled to the base plate 50 by the protrusions 52 of the base plate 50. However, the present invention is not limited thereto, and the base plate 50 and the sleeve holder 14 may be coupled by using a separate coupling member (not shown).

In this case, the base plate 50 has no protrusions 52 formed thereon, and holes with the same size as those of the insertion holes 18 of the flange 17 are formed to correspond to the positions where the protrusions 52 of the sleeve holder 14 are formed. The separate coupling member passes through both insertion holes 18 and holes of the base plate 50 in such a manner that the sleeve holder 14 is coupled to the base plate 50. Herein, as the coupling member, a rivet may be used.

Also, the above-mentioned embodiment of the present invention has been described by taking an example where the sleeve holder 14 is coupled to the base plate 50 only by the protrusions 52 formed on the base plate 50. However, in order to increase a coupling force therebetween, an adhesive member (not shown) may also be interposed between the base plate 50 and the flange 17 of the sleeve holder 14. Herein, as for the adhesion member, an adhesive, an adhesive tape, or the like may be used.

In addition to this, the above-mentioned embodiment of the present invention has been described by taking an example in which each of the protrusions 52 is formed on the base plate 50. However, in contrast to this, the protrusions may also be formed on the lower surface of the flange 17 of the sleeve holder 14, and insertion holes are formed in the base plate 50 so that the sleeve holder 14 is coupled to the base plate 50.

Figure 6:
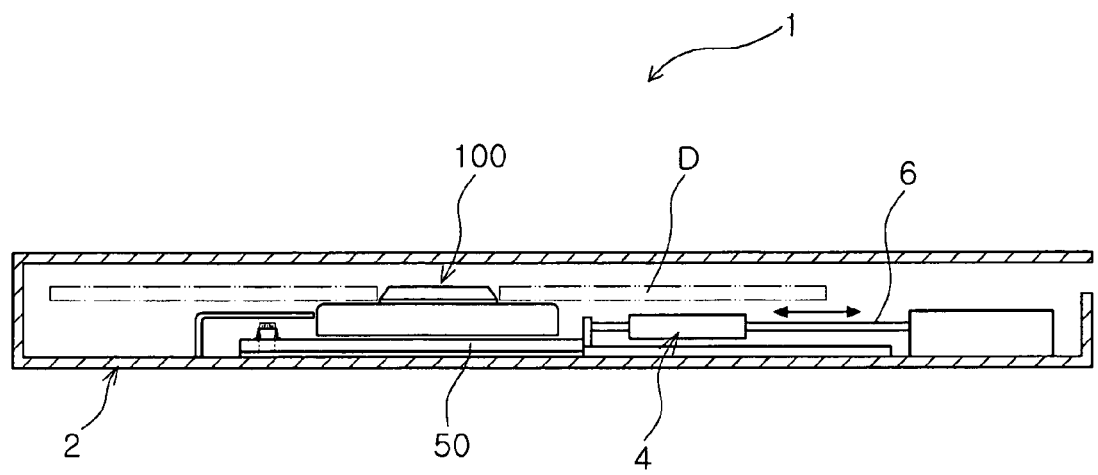
FIG. 6 is a cross-sectional view schematically showing an optical disc drive according to an embodiment of the present invention.

FIG. 6 is a cross-sectional view schematically showing an optical disc drive according to an embodiment of the present invention.

Referring to FIG. 6, the optical disc drive 1 according to the embodiment of the present invention has the above-mentioned motor 100 mounted thereon.

The optical disc drive 1 may include a frame 2, an optical pickup device 4, and a transfer device 6.

The frame 2 acts as a case of the optical disc drive 1. The base plate 50 of the motor is fixed to the inside of the frame 2.

The optical pickup device 4 is installed to be movable within the space below the disc D mounted on the motor 100, and receives data from the disc D.

The transfer device 6 transfers the optical pickup device 4 toward the diameter direction of the disc D, to receive data from the entire surfaces of the disc D.

According to the motor with the above-described structure and the optical disc disk drive, a sleeve holder is directly fixed and coupled to the top of the base plate integrated with a supporting plate, even without a separate supporting plate, in comparison to the related art in which both the sleeve holder and supporting plate are used.

Thus, unlike the related art, it is possible to reduce components of the motor, and thus to implement a reduction in production costs and to simplify a manufacturing process.

Also, according to the embodiment of the present invention, the motor is provided with a sleeve holder formed by press-processing a steel plate, differently from the related art in which a sleeve holder is formed by cutting-processing brass. That is, it is possible to manufacture a sleeve holder in a simple process by using a less-expensive material, instead of relatively high-priced brass, and thus to reduce cost and time taken for manufacturing the sleeve holder.

Also, in the motor of the embodiment of the present invention, the sleeve holder is provided with a lower surface which makes surface-to-surface contact with the base plate. The sleeve holder is bonded to the base plate as being in contact with the base plate by using a wide area of the flange, so it is possible to tightly or stably couple the sleeve holder to the base plate.

Also, in the related art, there has been a problem in that each of the base plate and the supporting plate is necessarily coupled to the sleeve holder, which results in two coupling processes. However, the present invention has an advantage in that it is possible to implement the coupling of the base plate and the sleeve holder through a single process, even without a process of coupling the supporting plate to the sleeve holder. Therefore, it is possible to minimize pressure applied to the sleeve and the base plate during the coupling process, and thus reduce a degree of influence thereof for axial perpendicularity of the motor. As a result, it is possible to provide an effect of improving a process yield.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
a base plate having at least one protrusion formed therein;
a sleeve holder having a body part, of which the shape is cylindrical and in which a sleeve is fitted, and a flange protrudingly formed from a lower end of the body part in such a manner as to make surface-to-surface contact with an upper surface of the base plate;
a stator having a core extended toward an outer diameter thereof and a winding coil wound around the core, the stator being in contact with an outer side of the sleeve holder; and
a rotor pressingly fixed to the shaft,
the flange formed to have at least one insertion hole, through which the protrusion is inserted so that the sleeve holder is coupled to the base plate,
the protrusion including an extension part formed by bending an end of the protrusion toward an outer diameter thereof,
the insertion hole having an inner circumference which is in contact with the upper surface of the flange, the inner circumference formed with a tapered inclined surface, and
the extension part placed in the tapered inclined surface.

2. The motor of claim 1, wherein the sleeve holder is manufactured by any one of press processing and injection-molding processing.

3. The motor of claim 1, wherein the sleeve holder has an enlarged part protruded from a circumferential surface of the body part and having an outer diameter larger than that of the body part.

4. The motor of claim 3, wherein the enlarged part is extensively protruded to reach the flange.

5. The motor of claim 3, further comprising a stator seated on and fixedly coupled to the enlarged part of the sleeve holder.

6. The motor of claim 1, wherein the base plate has a receiving part, formed to have a groove shape at a position where the body part of the sleeve holder is projected.

7. The motor of claim 6, further comprising a thrust plate, fixedly inserted into the receiving part and supporting a lower end of a shaft rotatably inserted in the sleeve.

8. The motor of claim 1, wherein an upper surface of the sleeve is exposed from the sleeve holder and faces the rotor.

9. An optical disc drive comprising:
a motor including
a base plate having at least one protrusion formed therefrom;
a sleeve holder having a body part, of which the shape is cylindrical and in which a sleeve is fitted, and a flange protrudingly formed from a lower end of the body part in such a manner as to make surface-to-surface contact with an upper surface of the base plate;
a stator having a core extended toward an outer diameter thereof and a winding coil wound around the core, the stator being in contact with an outer side of the sleeve holder; and
a rotor pressingly fixed to the shaft, the flange formed to have at least one insertion hole, through which the protrusion is inserted so that the sleeve holder is coupled to the base plate, the protrusion including an extension part formed by bending an end of the protrusion toward an outer diameter thereof, the insertion hole having an inner circumference which is in contact with the upper surface of the flange, the inner circumference formed with a tapered inclined surface, the extension part placed in the tapered inclined surfaces, and an upper surface of the sleeve being exposed from the sleeve holder and facing the rotor; and an optical pickup device which is movably installed in a space below a disc mounted on a motor, and the optical pickup device receiving data from the disc.

* * * * *